United States Patent [19]
Webb

[11] Patent Number: 5,334,080
[45] Date of Patent: Aug. 2, 1994

[54] SHELLFISH CRACKER, SHUCKER

[76] Inventor: Winston S. Webb, 3592 Camelia Pl., Largo, Fla. 34641

[21] Appl. No.: 986,904

[22] Filed: Dec. 8, 1992

[51] Int. Cl.5 ............................................. A22C 29/04
[52] U.S. Cl. ......................................... 452/16; 452/13
[58] Field of Search .................... 452/16, 13, 17, 12

[56] References Cited

U.S. PATENT DOCUMENTS

| | | | |
|---|---|---|---|
| 896,162 | 8/1908 | Roters | 452/16 |
| 1,041,198 | 10/1912 | Tiffany | 452/16 |
| 4,348,788 | 9/1982 | Jurcak | 452/16 |
| 4,796,333 | 1/1989 | Stinson, Jr. et al. | 452/16 |

FOREIGN PATENT DOCUMENTS 462623  1/1950  Canada ........................ 452/16

*Primary Examiner*—Willis Little

[57] ABSTRACT

A mechanical apparatus is disclosed, consisting of a platform for attaching tools to crack shellfish claws and shellfish body parts also for opening clams and oysters. The device is comprised of a rotating lever to which hand force is applied, and attached to coupling bars that are attached to a second lever and a blade that is attached and driven into a clam or oyster trapped between the lower plate and the blade. A shellfish claw or shellfish body part is cracked when trapped between a fixed bar and a rotating lever.

1 Claim, 5 Drawing Sheets

SHELLFISH CRACKER, SHUCKER

SUMMARY OF THE INVENTION

It is therefore the object of the present invention to provide an improved apparatus and method for cracking shellfish and shucking clams or oysters. The device comprised of a rotating lever to which hand force is applied and coupling bars that are attached to a second rotating lever. A blade is attached to the second lever and driven into a clam or oyster which is retained onto a base and trapped between a mounting plate and the blade. A shellfish claw or shellfish body part is cracked when trapped between a fixed mounted bar and the rotating second lever.

BRIEF DESCRIPTION OF THE DRAWINGS

The foregoing and additional objects, features and advantages of the present invention will become apparent from the following detailed description thereof, taken in conjunction with the accompanying drawings which.

DETAILED DESCRIPTION OF THE PREFERRED EMBODIMENT

Figure 1:
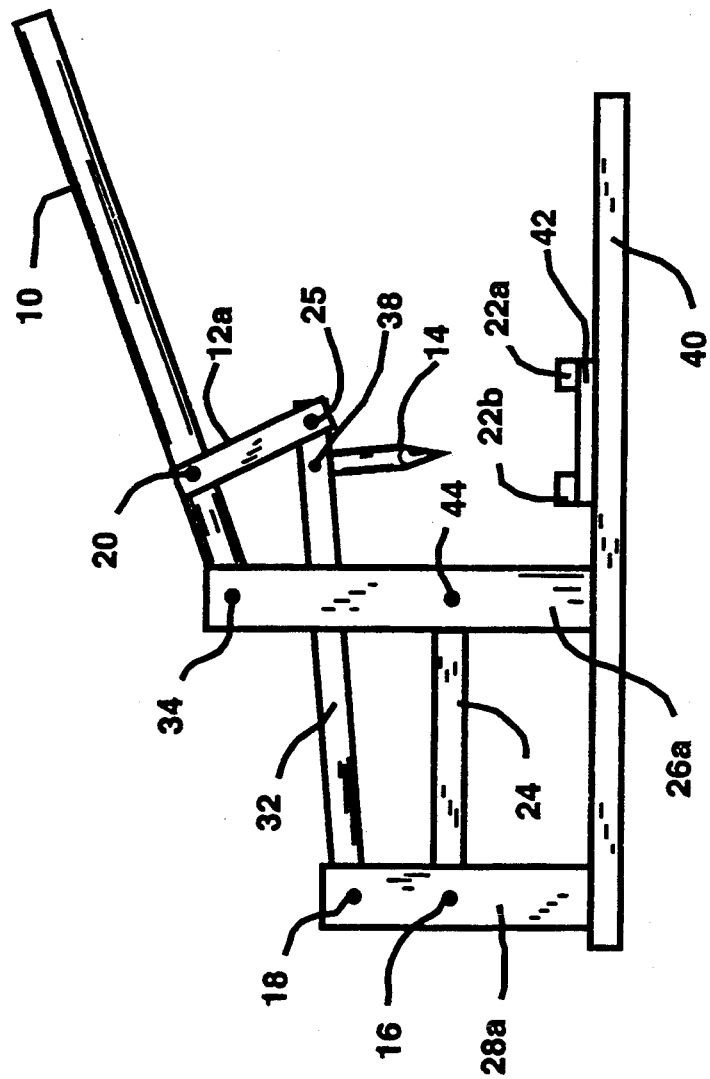
FIG. 1 is a side view of a preferred embodiment of the present invention.
Figure 2:
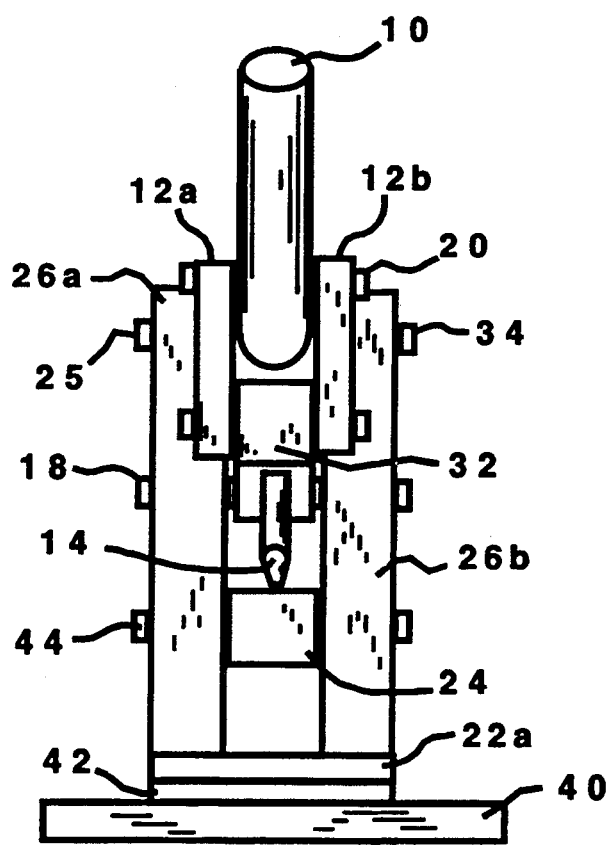
FIG. 2 is a front view of a preferred embodiment of the present invention.
Figure 3:
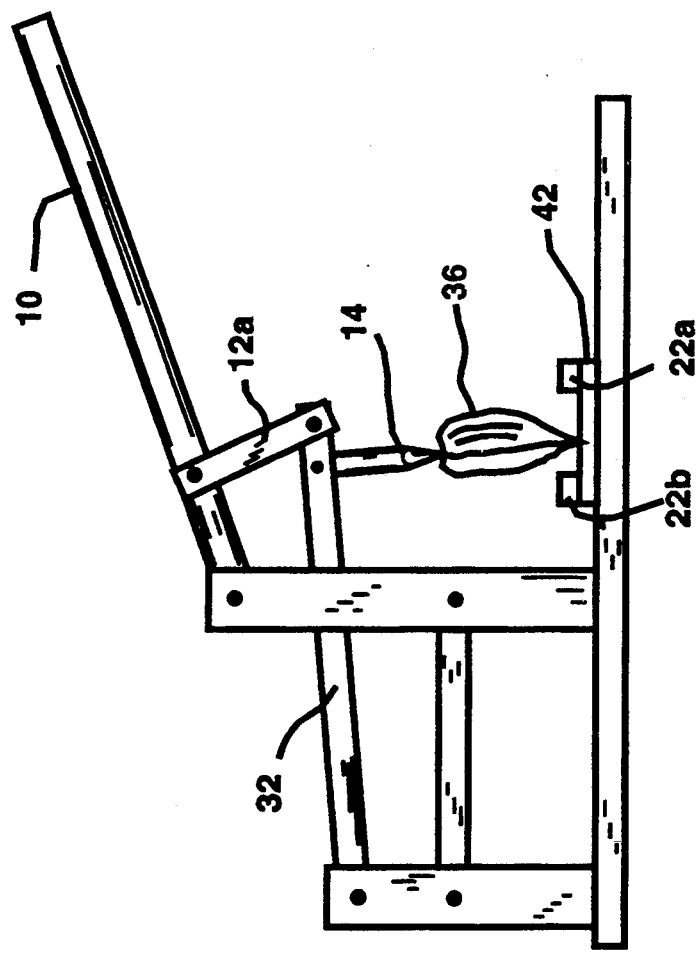
FIG. 3 is a side view of a preferred embodiment of the present invention, showing the placement of an oyster of clam (36).
Figure 4:
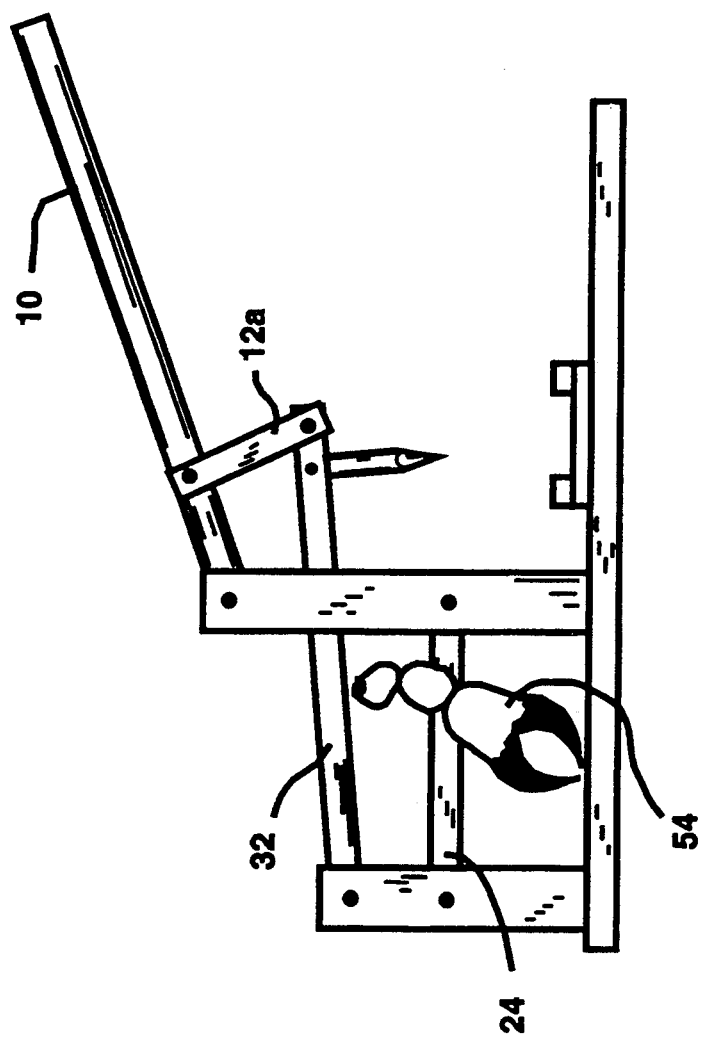
FIG. 4 is a side view of a preferred embodiment of the present invention, showing the placement of a shellfish claw (54)
Figure 5:
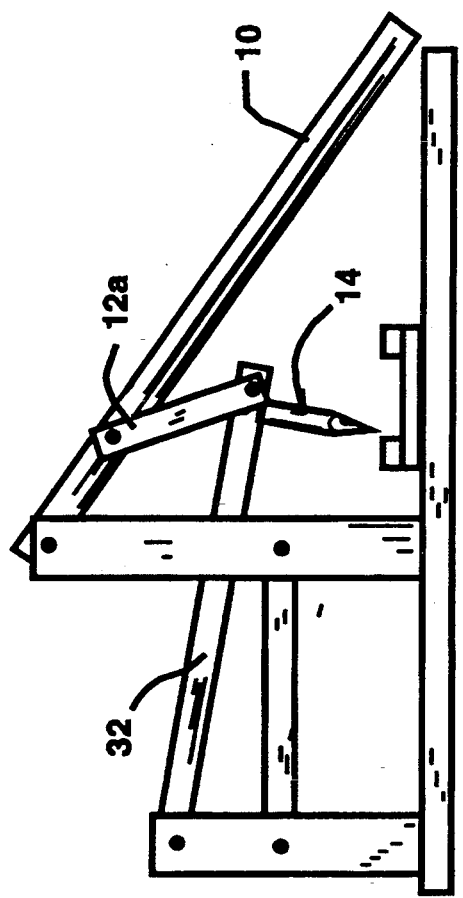
FIG. 5 is a side view of a preferred embodiment of the present invention, showing the unit in a closed position.

Turning now to a more detailed consideration of the present invention. A lever (10) rotates about a bolt or screw or any other fastener that establishes a pivot point (34) and is attached by means of two support brackets (26a) and (26b) to the base plate (40). Force input is applied by hand to lever (10) in a downward direction. Force output from the lever(10) is through axes (20) into two attached link bars (12a) and (12b). Force output from the link bars (12a) and (12b) is through axes (25). This output force becomes the force input to lever (32) which is attached by means of two support brackets (28a) and (28b) to the base plate (40). The input lever (32) is attached at one end, to and between support brackets (28a) and (28b) and rotates about an axis (18). The input lever (32) also has a blade (14) attached by a screw, bolt, or any other type of fastener (38) at the other end there of. The blade (14) becomes the force output from the lever (32). As shown in FIG. 3, a clam or oyster (36) is trapped between the blade (14) and a base pad (42) by placing the clam or oyster by hand onto the pad (42) and applying a force, by hand to lever (10) which moves the blade (14) downward. Then by applying additional force to lever (10) the tip of the blade (14) parts opens the clam or oyster (36). The clam or oyster is retained onto the pad (42) by the force applied and retained in position by two bars (22a) and (22b) then lift the main lever to remove clam or oyster when the shell is opened. A fixed support bar (24) is attached to and between the support brackets (26a and b) and (28a and b) via fasteners (44) and (16), respectively. As shown in FIG. 4, when a shellfish claw or body part (54) is placed onto the fixed bar (24), a small amount of force is applied by hand to the main lever (10) this rotates the input lever (32) and traps the claw or body part (54) between the input lever (32) and the fixed bar (24) which is attached through bolt or screw or fastener (16) to supports (28a) and (28b) and bolt or screw or fastener(44) to. By applying more force to the main lever (10) the shellfish claw or body part is cracked by the force applied. Afterwards the main lever (10) is lifted when the cracking process is finished.

Although the invention has been disclosed in terms of a preferred embodiment, it should be understood that numerous modifications and variations could be made thereto without departing from the true spirit and scope thereof as defined by the following claims.

What is claimed is:

1. A shellfish shucking and cracking machine comprising:

a horizontal base with a pad;

a pair of front and rear vertical supports mounted on the upper surface of said base and oriented parallel to each other;

a main lever pivotally mounted to and between the front pair of vertical supports near the top ends thereof;

a pair of link bars pivotally attached to one end to the main lever at a location proximate to the main lever pivotal connection to the front vertical supports; said link bars being oriented parallel to each other with one of said link bars positioned on either side on said main lever;

a fixed support cross-link mounted to and between said front and rear pairs of vertical supports; said fixed support cross-link being positioned above and parallel to the base to provide a support surface for a first shellfish body portion;

an input lever pivotally attached to and between the rear vertical supports and the free ends of the link bars, at opposite ends thereof; said input lever being positioned above said fixed support cross-link at a distance, whereby said input lever contacts and cracks open the shellfish body portion positioned on said cross-link support when a downward force is applied to the input lever by said main lever via the link bars;

a blade mounted to the input lever at the end proximate the link bar connection and above the pad for opening a second shellfish body portion supported on said pad, when a downward force is applied by the main lever to the input lever.

* * * * *